Feb. 8, 1966  C. P. LENT  3,233,703
ELECTRIC REWIND FOR SPRING-WOUND MOTION PICTURE CAMERAS
Filed March 30, 1964  3 Sheets-Sheet 1
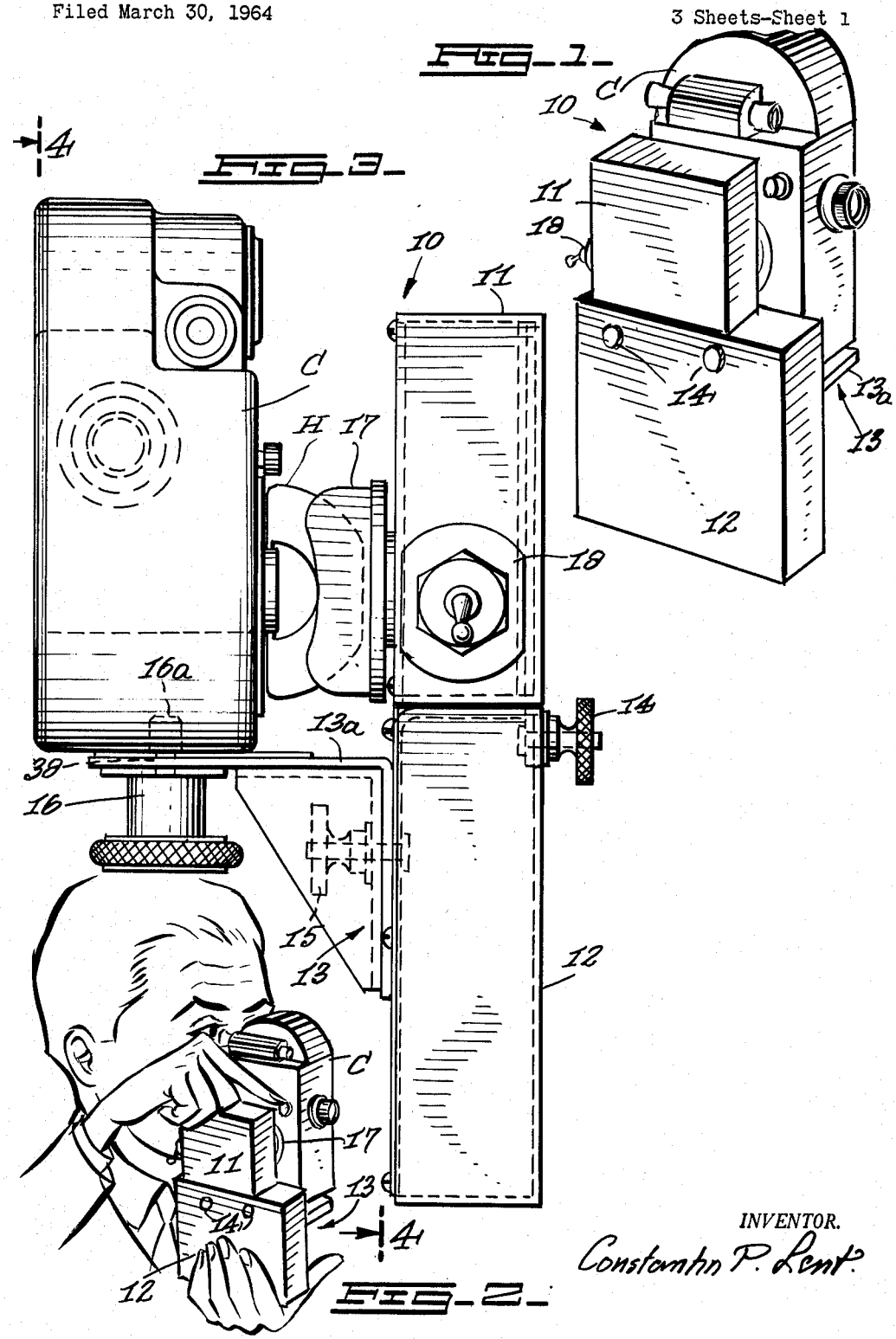
INVENTOR.
Constantin P. Lent

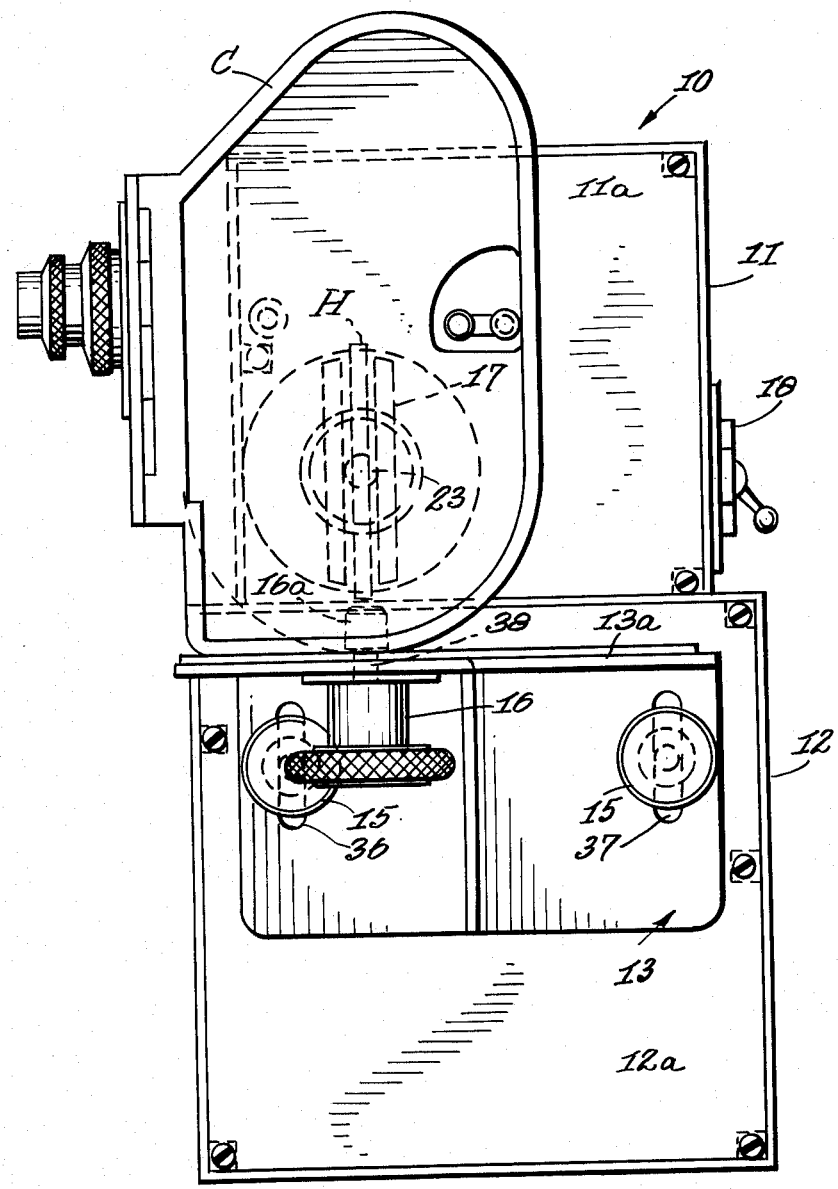
FIG_4_

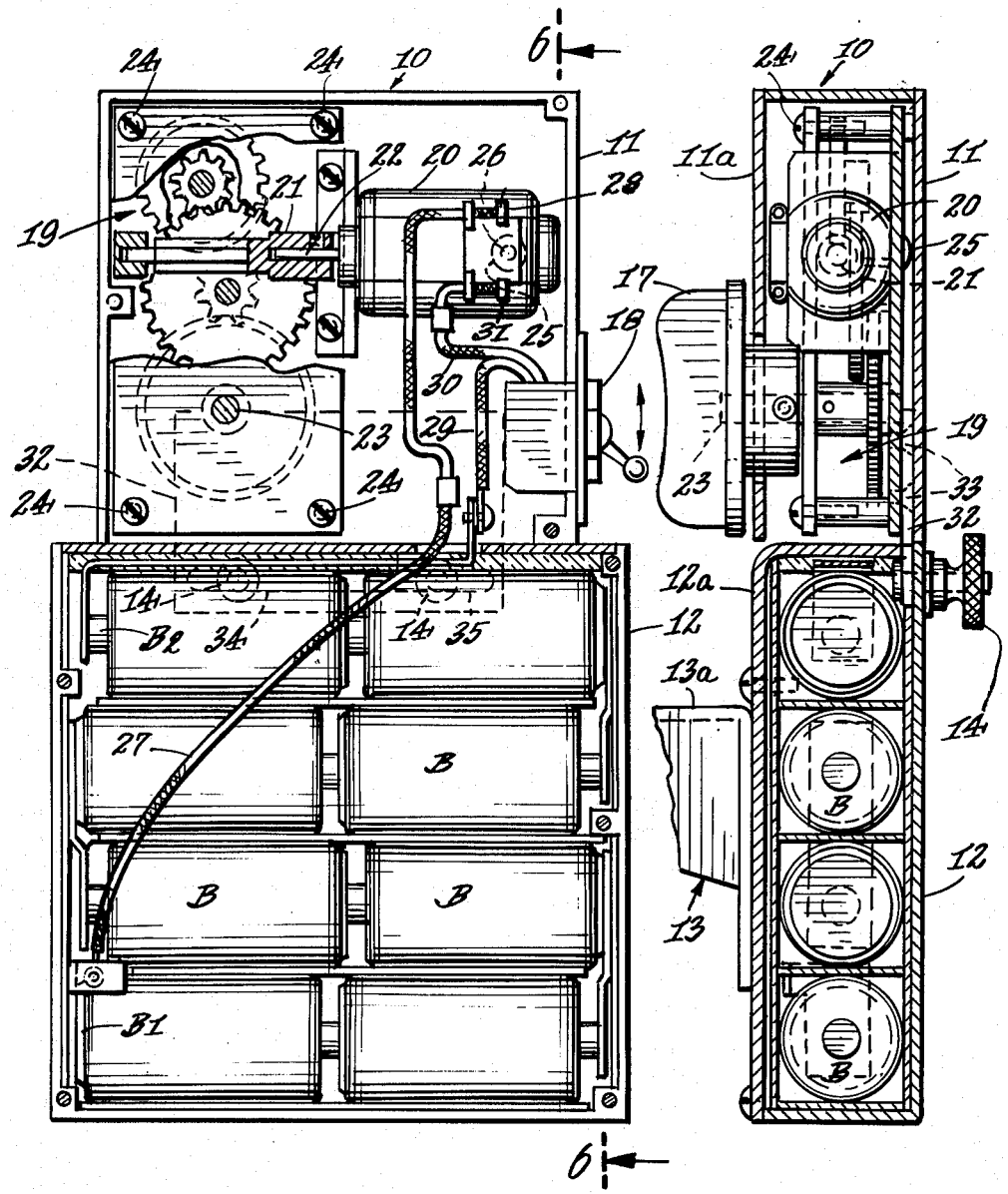

United States Patent Office 3,233,703
Patented Feb. 8, 1966

3,233,703
ELECTRIC REWIND FOR SPRING-WOUND
MOTION PICTURE CAMERAS
Constantin Paul Lent, 108—02 72nd Ave.,
New York, N.Y.
Filed Mar. 30, 1964, Ser. No. 355,571
4 Claims. (Cl. 185—40)

The present invention relates to rewind mechanisms and more particularly it relates to such devices which may be readily utilized to rewind the spring in a motion picture camera of standard manufacture. The present device is not an integral part of a spring wound camera, but, it is an accessory device to which the camera may be secured. A standard make of camera is provided with a rewind handle. The device of the present invention may be provided with a rewind clutch. To wind the spring in the camera the handle is coupled to the clutch. As the spring in the camera unwinds in the process of taking pictures and becomes lax, by means of the clutch in the device the winding handle is turned automatically to rewind the spring. The spring may be rewound during the operation of the camera or when the camera is not in use. In either case the winding handle will be rotated until the spring is fully wound, then the device will stop. The device may be provided with an automatic cut-off switch to stop the operation of the electric motor when the spring is fully wound, or the motor may be cut-off manually by means of the switch when the winding is completed. It is understood that the small electric motor winding the clutch may be of such manufacture as to prevent burn-outs when it is stalled at the end of the rewind operation. Also, the device may be provided with a "red" light which goes on when the spring is fully wound or a small bell or a buzzer to indicate to the camera operator that the spring is wound and to shut off the motor. The motor in the device may be operated by means of batteries, or it may be operated directly from house current, or batteries carried in a portable case and a shoulder strap, or rechargeable batteries.

Because there are several makes of cameras on the market, some large, some small, and because the device in question must fit nearly all makes, it must be so formed as to be adjustable. It is important that the center line of the rewind coupling in the device is in line with the center of the winding handle in the camera. To accomplish this the device may be provided with an adjustable mounting bracket or an adjustable base upon which the motion picture camera rests secured by means of a mounting knob or a handle. Most all cameras are provided with a tripod mounting thread (usually ¼–20 inch) which may be readily used to help mount the camera to the bracket. For a perfect alignment of the centers of the winding handle and the rewind coupling the mounting means must be adjustable in a vertical plane, in a horizontal plane, and side-ways. This can be accomplished by means of one single mounting bracket which is formed in sections and is adjustable, or by means of several individual mounting sections with each section individually secured ot the other by means of mounting screws which pass through elongated slots. By loosening the screws it may be possible to align the center line of the winding handle with the center line of the coupling, and then to make the screws tight. Also, the camera may be adjustably secured to the winding device by means of a swiveling coupling. Because not all cameras have winding handles of the same construction, it might be necessary to provide an adapter which may be interposed between the handle of the camera and the rewind coupling in the device to fit both.

There are several makes of motion picture cameras for 8 mm. and 35 mm. motion picture photography. Some of these cameras are spring operated and some others are electrically operated. Usually a spring wound camera is provided with a winding handle on the outside, while a battery operated camera contains the batteries in the camera case or housing. There are millions of older cameras at present use which are spring operated, and some of the best new cameras are still provided with a spring mechanism and a handle. It is known that battery operated cameras are troublesome. The batteries soon are depleted, or because of disuse the batteries dry out; so that when the operator out in the field is just about ready to take pictures he discovers that the batteries are dead. Under these conditions the operator is better off in using a spring wound camera instead. But, the latter has the disadvantage that its spring may be completely unwound just when the operator is anxious to take some action pictures. By the time the operator has rewound the camera spring, it is too late to take the pictures. By means of the present invention it is possible to have the camera always ready for picture taking and one need not rewind the camera for every few feet of picture taking. In the event the batteries in the rewind mechanism become depleted, the spring wound camera is removed from the rewind device and may be operated by means of its own spring driven mechanism until the batteries in the device are replaced or recharged.

Accordingly, a primary object of this invention is to provide a means for automatically winding the spring in a spring wound motion picture camera as the spring unwinds in the process of taking motion pictures.

Another object of this invention is to provide an adjustable bracket and mounting means by means of which a camera of standard make may be readily secured to the spring winding device.

A further object of this invention is to provide an accessory device which may be provided with a battery case, an electric motor, a gear reduction means and a rewind coupling for the purpose set forth.

An additional object of this invention is to provide means for adjustably mounting a motion picture camera to the accessory device by means of the tripod thread in the camera.

Another object of this invention is to provide means by which the rewind coupling may be connected and disconnected when the spring in the camera needs winding, or it is fully wound.

A further object of this invention is to provide a cut-off switch for the motor when the spring in the camera is fully wound.

Another object of this invention is to provide a light or an audible signal means which will indicate that the spring in the camera is fully wound.

This invention also consists in certain other features of construction, and the combination and arrangement of parts, to be hereinafter fully described, illustrated in the accompanying drawings, and specifically pointed out in the appended claims.

In describing the invention in detail, references will be made to the accompanying drawings, where like character numerals denote like or corresponding parts throughout the several views, in which:

FIG. 1 is a perspective elevational view showing the manner in which a camera of standard make may be secured to the spring rewind mechanism of the present invention;

FIG. 2 is a view showing the manner in which an operator holds and sights the device of the present invention during the process of taking motion pictures;

FIG. 3 is a rear elevational view showing the manner in which a camera of standard make may be held thereto and the alignment of the camera handle and the rewind coupling;

FIG. 4 is a front elevational view of the device mounting a camera, taken on the line 4—4 of FIG. 3;

FIG. 5 is a front elevational view with the cover broken away disclosing the inside of the device, the gear reduction, the electric motor, the batteries and the electric circuit leading from the batteries to the cut-off switch;

FIG. 6 is a section taken on the line 6—6 of FIG. 5 showing additional details of the rewind mechanism.

It is to be understood that the present form of disclosure is merely for the purpose of illustration and that there might be various modifications thereof, without departing from the spirit and the scope of the invention as herein set forth.

Referring now more particularly to the spring rewind device 10, made in accordance with the present invention, best seen in FIG. 1, it comprises, in combination, the upper housing 11; the lower housing 12; the adjustable mounting bracket 13; the manually adjustable knobs 14 for the upper housing; the manually adjustable knobs 15 for the bracket 13 (see FIG. 3); the adjustable mounting knob 16 for the camera (C) having a handle (H); one way clutch or the rewind coupling 17; and the cut off or on-and-off electric switch 18.

Reference now being made to FIGS. 5 and 6, inclusive, it may be seen that the upper housing 11 has a cover 11a, while the lower housing 12 has a cover 12a. Within the upper housing 11 there is mounted a gear reduction or a train of gears 19 which by means of the electric motor 20 and the gear pinion 21 on the motor shaft 22 drives or operates the winding shaft 23 with its rewind coupling 17. The train of gears 19 is similar in construction and operation to any standard train of gears used in reducing the high speed of the shaft in an electric motor to the low speed of a drive shaft, and need not any further explanation. The train of gears 19, by means of the screw studs 24 may be securely mounted into the upper housing 11 substantially as shown. The screw 25 threading into the hole 26 in the motor 20 holds the latter to the housing 11.

From FIG. 5 it can be discerned that a group of dry cell batteries (B) may be mounted inside the lower housing 12, back to back, in series. The plus end of the lowermost battery (B1) by means of the conduit wire 27 connects to the motors 20 and 28, while the minus end of the uppermost battery (B2) connects by means of the conduit wire 29 to the switch 18. A secondary wire 30 running from the motor 20 at 31 connects the switch 18 to the motor 20, thus completing the electrical circuit from the batteries, to the motor, to the switch.

The upper housing 11, by means of the flat rectangular plate 32 (which is held thereto by means of the machine screws 33) may be made to slide lengthwise relative to the lower housing 12. To this effect the plate 32 may be provided with a pair of lengthwise slots 34 and 35, inclusive, into which are being fitted the threaded ends of the pair of knobs 14. Loosening the knobs 14 permits the moving of the upper housing lengthwise, tightening upon the knobs 14 secures the upper housing 11 tight to the lower housing 12. By sliding the upper housing 11 relative to the lower housing 12 it is possible to vary the position of the winding shaft 23 in relationship to the lower housing 12.

The adjustable bracket 13 (see FIG. 4) may be provided with a pair of vertical slots 36 and 37, respectively, into which are being fitted the threaded ends of the pair of knobs 15. The knobs 15 may be partially loosened to permit by means of the slots 36 and 37 the adjustment of the bracket 13 in a vertical plane, while the tightening upon the knobs 15 secures the bracket 13 permanently to the lower housing 12. It can be discerned that the horizontal member 13a of the bracket 13 may be provided with a slot 38 cut thereto and located in a sideways relationship with the housing 12. By means of the knob 16 and the thread (¼–20) cut in the base of the motion picture camera (C) (see FIG. 4) it is possible to adjust the relative position of the camera (C) away from the housing 12. In such manner it is possible by means of the lengthwise adjustment provided by the slots 34 and 35, the vertical adjustment provided by the slots 36 and 37, and by the sideways adjustment provided by the slot 16 to adjust the camera (C) on the bracket 13 in all three planes. By means of the three adjustments aforesaid it is possible to align the camera spring winding handle (H) with the one way clutch 17 so as to facilitate a rewind of the former by the latter when the motor 20 is in motion.

Under normal conditions, when the spring in the camera is fully wound, the one way clutch 17 cannot turn any longer and the motor 20 stalls. The dull sound made by the stalled motor is sufficient warning to the operator and an indication that the motor should be shut off. As it was already remarked before, it is possible to provide the device with an automatic shut off swich, but, by actual tests it was found that the stalled motor does not become damaged if the motor is shut-off within a reasonable time after the spring has been fully wound. The operation of my device is so simple that it does not need any further description.

A careful examination of the foregoing description in conjunction with the invention as illustrated in the drawings, will enable the reader to obtain a clear understanding and impression of the alleged features of merit and novelty, sufficient to clarify the construction of the invention as hereinafter claimed. Minor changes in shape, size and materials, and rearrangement of parts, may be resorted to in actual practice, as long as no departure is made from the invention claimed.

Having described my invention, what I claim is the following:

1. A device to wind the spring in a spring-wound motion picture camera, said camera having a rewind handle, said device comprising, in combination an electric motor driven mechanism for winding said handle, and an electric battery means to supply current to operate said motor, said motor driven mechanism comprising a gear reduction driven by said motor and a drive shaft with one way clutch, said camera handle being joined to said clutch to be wound by said mechanism, said mechanism being mounted in a housing, said battery means being mounted in a separate housing, said first housing being slideably held to said second housing to permit linear adjustment relative to one another, said first housing being located over said second housing in a vertical plane, and a bracket means for mounting said camera to said second housing, said bracket means comprising a plate adjustably held to said second housing to permit vertical adjustment relative to said second housing, said bracket having an extension at right angles thereof, said camera being adjustably held to said extension, and means for adjusting said camera upon said extension in a linear direction to and from said one way clutch, the relative position of said first housing to said second housing in a horizontal plane, and the relative position of said bracket in a vertical plane facilitating the centering of said camera handle with respect to said one way clutch, whereas the linear adjustment of said camera handle to or from said one way clutch facilitating the engagement of said handle with said one way clutch for rewinding the spring in said camera.

2. A device to wind the spring in a spring-wound motion picture camera, said camera having a rewind handle, means for adjustably mounting said camera to said device, said device having an upper and a lower housing, said upper housing having an electric motor operated rewind mechanism with a one way clutch, said camera handle being joined to said clutch for rewind purposes, said lower housing having battery means to operate said electric motor, an electric circuit with an on and off switch connecting said motor to said battery, said upper housing being adjustably mounted over the second housing, said upper housing being moved linearly relative to said lower housing, a bracket means being adjustably held to said lower housing, said bracket being moved in a vertical plane relative to said first housing, said camera being adjustably mounted upon said bracket, said camera being moved in a linear direction to and from said one way clutch.

3. The combination according to claim 1; said device including an electric circuit and a switch, flexible conduit wire means connecting said electric motor in the first housing to said battery in the second housing, the flexible conduit wire aforesaid permitting flexing of said wire during the linear adjustment between the first and second housing when the first and the second housing are adjusted to a relative position with one another.

4. The same as claim 2: slot means with screws permitting the linear adjustment between said upper and said lower housing, slot means with screws permitting the vertical adjustment of said bracket between itself and the upper housing, and slot and knob means permitting the adjustment of said camera to and from said clutch, the tightening upon said screws and said knob securing said camera fast to said device and permitting the centering of said rewind handle with said one way clutch.

References Cited by the Examiner
UNITED STATES PATENTS

| | | | |
|---|---|---|---|
| 1,301,358 | 4/1919 | Beckman | 185—40 |
| 1,878,076 | 9/1932 | Wallace | 185—40 |
| 2,709,392 | 5/1955 | Dantzic | 248—287 X |
| 2,759,561 | 8/1956 | Bolsey | 185—40 |
| 2,783,367 | 2/1957 | Locke | 248—287 X |
| 3,008,371 | 11/1961 | Brault et al. | 185—40 X |

SAMUEL LEVINE, *Primary Examiner.*

EDGAR W. GEOGHEGAN, *Examiner.*